US012443332B2

(12) United States Patent
He et al.

(10) Patent No.: US 12,443,332 B2
(45) Date of Patent: Oct. 14, 2025

(54) INFORMATION PROCESSING METHOD AND APPARATUS

(71) Applicant: LENOVO (BEIJING) LIMITED, Beijing (CN)

(72) Inventors: Jin He, Beijing (CN); Meng Luo, Beijing (CN); Yuhao Kuang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/619,700

(22) PCT Filed: May 27, 2020

(86) PCT No.: PCT/CN2020/092688
§ 371 (c)(1),
(2) Date: Dec. 16, 2021

(87) PCT Pub. No.: WO2021/000668
PCT Pub. Date: Jan. 7, 2021

(65) Prior Publication Data
US 2022/0357822 A1    Nov. 10, 2022

(30) Foreign Application Priority Data

Jun. 30, 2019   (CN) ........................ 201910581825.X

(51) Int. Cl.
*G06F 3/0484*    (2022.01)
*G06F 3/0481*    (2022.01)
*G06F 9/451*     (2018.01)

(52) U.S. Cl.
CPC .......... *G06F 3/0484* (2013.01); *G06F 3/0481* (2013.01); *G06F 9/451* (2018.02); *G06F 2203/04803* (2013.01)

(58) Field of Classification Search
CPC ...... G06F 3/0484; G06F 9/451; G06F 3/0481; G06F 2203/04803
See application file for complete search history.

(56) References Cited

U.S. PATENT DOCUMENTS 6,112,215 A  *  8/2000  Kaply ................. G06F 3/04895
                                                        715/810
6,499,042 B1 * 12/2002  Markus ................ G06F 40/174
                                                        709/219

(Continued)

FOREIGN PATENT DOCUMENTS

CN     101694650 A     4/2010
CN     106126156 A    11/2016

(Continued)

OTHER PUBLICATIONS

The World Intellectual Property Organization (WIPO) International Search Report for PCT/CN2020/092688 Aug. 26, 2020 7 Pages (including translation).

(Continued)

*Primary Examiner* — William L Bashore
*Assistant Examiner* — Gregory A Distefano
(74) *Attorney, Agent, or Firm* — ANOVA LAW GROUP, PLLC

(57) ABSTRACT

Embodiments of the present disclosure provide an information processing method and apparatus. The information processing method includes if a first interface includes at least one input area, responding to a first instruction to call up a target input information corresponding to a target input area at the at least one input area, where the target input information is one piece of the at least one information in a second interface. The information processing method further includes responding to a second instruction at the second interface and outputting the target input information in the (Continued)

target input area. Wherein, the first interface is different from the second interface, thereby improving the input efficiency of information.

16 Claims, 8 Drawing Sheets

(56) References Cited

U.S. PATENT DOCUMENTS

| | | | | |
|---|---|---|---|---|
| 6,928,623 B1* | 8/2005 | Sibert | ................... | G06F 3/0481 |
| | | | | 715/802 |
| 9,276,991 B2* | 3/2016 | DeRoller | ................ | H04L 67/02 |
| 9,846,689 B2* | 12/2017 | Perelman | ............. | G06F 40/174 |
| 2005/0289114 A1* | 12/2005 | Bellamy | ............... | G06F 16/284 |
| 2006/0059434 A1* | 3/2006 | Boss | ................... | G06F 16/9535 |
| | | | | 715/780 |
| 2006/0179404 A1* | 8/2006 | Yolleck | ................ | G06F 40/174 |
| | | | | 715/272 |
| 2011/0185314 A1* | 7/2011 | Sahai | ...................... | G06F 9/451 |
| | | | | 715/838 |
| 2012/0136682 A1* | 5/2012 | Harris | .................... | G06Q 10/02 |
| | | | | 705/5 |
| 2014/0101553 A1* | 4/2014 | Nagel | ................... | G06F 3/0482 |
| | | | | 715/728 |
| 2014/0304628 A1* | 10/2014 | Soni | ....................... | G06F 40/174 |
| | | | | 715/764 |
| 2019/0243889 A1* | 8/2019 | Carter | ................. | G06F 3/04883 |

FOREIGN PATENT DOCUMENTS

| | | |
|---|---|---|
| CN | 108829301 A | 11/2018 |
| CN | 110225180 A | 9/2019 |
| CN | 110286991 A | 9/2019 |
| CN | 111104236 A | 5/2020 |
| JP | 2010113519 A | 5/2010 |

OTHER PUBLICATIONS

Guowei Li, "University Computer Application Basic Course," China Railway Publishing House, Beijing, China, Aug. 30, 2009, pp. 93-94. 3 pages.

* cited by examiner

| Game registration | |
|---|---|
| Name | |
| Phone number | |
| QQ number | |
| Game account | |
| Nickname | |
| Email | |

Submit

FIG. 2

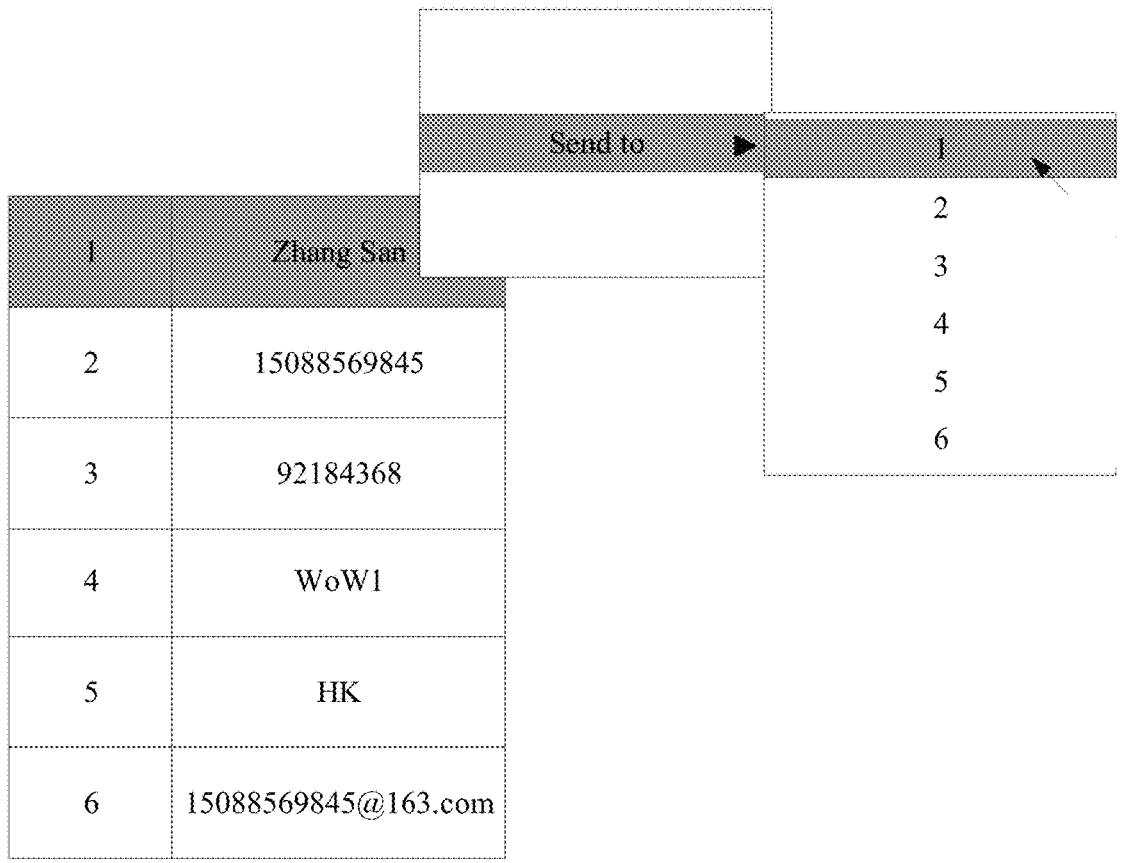

FIG. 6

```
┌─────────────────────────────────────────────────────────────────────┐  ─ S11
│ If the first interface includes at least one input area, responding │
│ to the first instruction to call up the target input information    │
│ corresponding to the target input area of the at least one input    │
│ area                                                                │
└─────────────────────────────────────────────────────────────────────┘
                                    │
                                    ▼
┌─────────────────────────────────────────────────────────────────────┐  ─ S12
│ Responding to the second instruction at the second interface,       │
│ transmitting the target input information to a storage position     │
│ corresponding to the target input area of the first interface to    │
│ output the target input information at the target input area        │
└─────────────────────────────────────────────────────────────────────┘
```

FIG. 7

| 1 | Zhang San |
|---|---|
| 2 | 15088569845 |
| 3 | 92184368 |
| 4 | WoW1 |
| 5 | HK |
| 6 | 15088569845@163.com |

INFORMATION PROCESSING METHOD AND APPARATUS

CROSS-REFERENCE TO RELATED APPLICATIONS

This application claims priority to PCT Application No. PCT/CN2020/092688, filed on May 27, 2020, which claims priority to Chinese Patent Application No. 201910581825.X, filed on Jun. 30, 2019. The entire content of is the two applications are incorporated herein by reference.

TECHNICAL FIELD

The present disclosure generally relates to the information processing technology field and, more particularly, to an information processing method and an apparatus.

BACKGROUND

With the development of internet technology, electronic registration, and online registration become more and more common. During specific operations, it is usually necessary to enter a lot of commonly used information, such as name, phone number, ID number, address, email, etc. Therefore, when inputting common information, how to input information quickly and effectively has become an urgent problem to be solved by those skilled in the art.

SUMMARY

Embodiments of the present disclosure provide the following technical solutions:

An information processing method includes:
  if a first interface includes at least one input area, responding to a first instruction to call up a target input information corresponding to a target input area at the at least one input area, wherein the target input information is one of the at least one information of a second interface;
  responding to a second instruction to output the target input information at the target input area;
  wherein, the first interface is different from the second interface.

Preferably, the second interface and the first interface are two independent display windows, and the target input area is any one of the at least one input area.

Preferably, responding to a second instruction on the second interface and outputting the target input information in the target input area includes:
  outputting the target input information in the target input area based at least on the identification information corresponding to the target input area.

Preferably, the second instruction is a sending instruction, and the sending instruction is configured to transmit the target input information to the storage location corresponding to the target input area at the first interface according to a selection instruction, such that the target input area outputs the target input information;
  wherein, the selection instruction is related to identification information corresponding to the target input area.

Preferably, the second instruction is a paste shortcut instruction. The identification information of the target input area corresponds to the paste shortcut instruction of the target input information. The paste shortcut instruction is configured to transmit the target input information to a storage location corresponding to the target input area of the first interface, such that the target input area outputs the target input information.

Preferably, the second interface is a display window associated with a toolbar display window at the first interface. The target input area is the position of the pointer in the first interface, and the information of the second interface is stored backup information.

Preferably, the second instruction is a selection instruction configured to determine the target input information in at least one information at the second interface, such that the target input area outputs the target input information.

Preferably, the method further includes editing the information of the second interface.

Preferably, editing the information of the second interface includes:
  inputting information at the second interface and adding the information to the backup information of the second interface;
  or,
  selecting parts of the display information at the first interface and adding the part of the display information to the backup information of the second interface.

An information processing apparatus includes:
  a call-up module, if the first interface includes at least one input area, responding to the first instruction to call up the target input information corresponding to the target input area at the at least one input area, wherein the target input information is one of the at least one information of the second interface;
  an output module configured to respond to the second instruction and output the target input information at the target input area;
  wherein, the first interface is different from the second interface.

An electronic apparatus includes a memory and a processor. The processor is configured to execute programs is stored at the memory, and the memory is configured to store the program. The program is at least configured:
  if the first interface includes at least one input area, to respond to the first instruction to call up the target input information corresponding to the target input area at the at least one input area, wherein the target input information is one of the at least one information of the second interface;
  to respond to the second instruction at the second interface and output the target input information at the target input area;
  wherein, the first interface is different from the second interface.

The technical solution provided by the embodiment of the present disclosure may directly input the target input information displayed in the second interface into the target input area at the first interface by responding to the second instruction at the second interface. The above-described method may input the target input information into the target input area without leaving the second interface and returning to the position of the target input area in the first interface, which simplifies the operation of the target input information and improves the input efficiency of the target input information.

BRIEF DESCRIPTION OF THE DRAWINGS

To make technical solutions of the present disclosure clearer, embodiments of the present disclosure are described in conjunction with accompanying drawings in embodiments of the present disclosure. Obviously, the described accompanying drawings are only some embodiments of the present disclosure. For ordinary skills in the technical field, all other accompanying drawings can be obtained by those of ordinary skill in the art without any creative work.

FIG. 2 is a schematic diagram of a non-interactive interface according to some embodiments of the present disclosure.

FIG. 6 is a schematic diagram showing contents of a second interface according to some embodiments of the present disclosure.

FIG. 7 is a schematic flowchart of still another information processing method according to another embodiment of the present disclosure.

FIG. 8 is a schematic diagram of a user's operation according to some embodiments of the present disclosure.

FIG. 9 is a schematic diagram of a call-up operation process of a target input information according to some embodiments of the present disclosure.

DETAILED DESCRIPTION OF THE EMBODIMENTS

As described in the background art, when inputting common information, how to input information quickly and effectively becomes an urgent problem for those skilled in the art.

Currently, the commonly used information input method is mainly a user's tapping input, not only the input efficiency is low, but also, if the amount of input information is large, the user needs to remember more common information. An accuracy rate mainly depends on a user's memory information, and an error rate is relatively high. Although the information may be copied from other places to an information input interface, an existing copy and paste method requires the user to leave the information input interface first before going to an information recording interface to copy, and then leave the information recording interface and return to an information input interface to paste. The operation is cumbersome, and the input efficiency needs to be improved.

Figure 1:
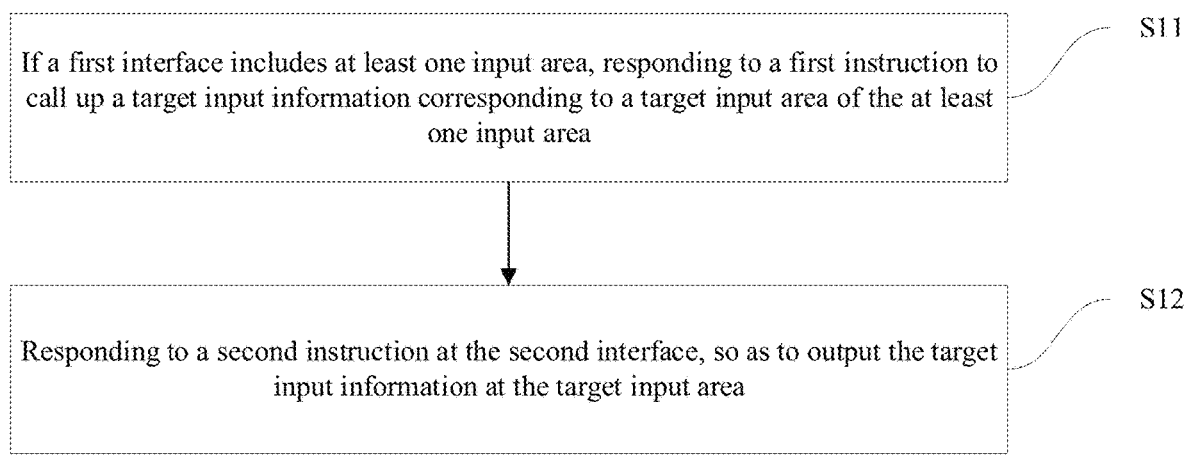
FIG. 1 is a schematic flowchart of an information processing method according to some embodiments of the present disclosure.

According to the above description, an embodiment of the present disclosure provides an information processing method. As shown in FIG. 1, the method may include but is not limited to the following steps:

Step S11: If the first interface includes at least one input area, responding to the first instruction to call up a target input information corresponding to a target input area of the at least one input area, wherein the target input information is one of at least one information in a second interface.

Figure 3:
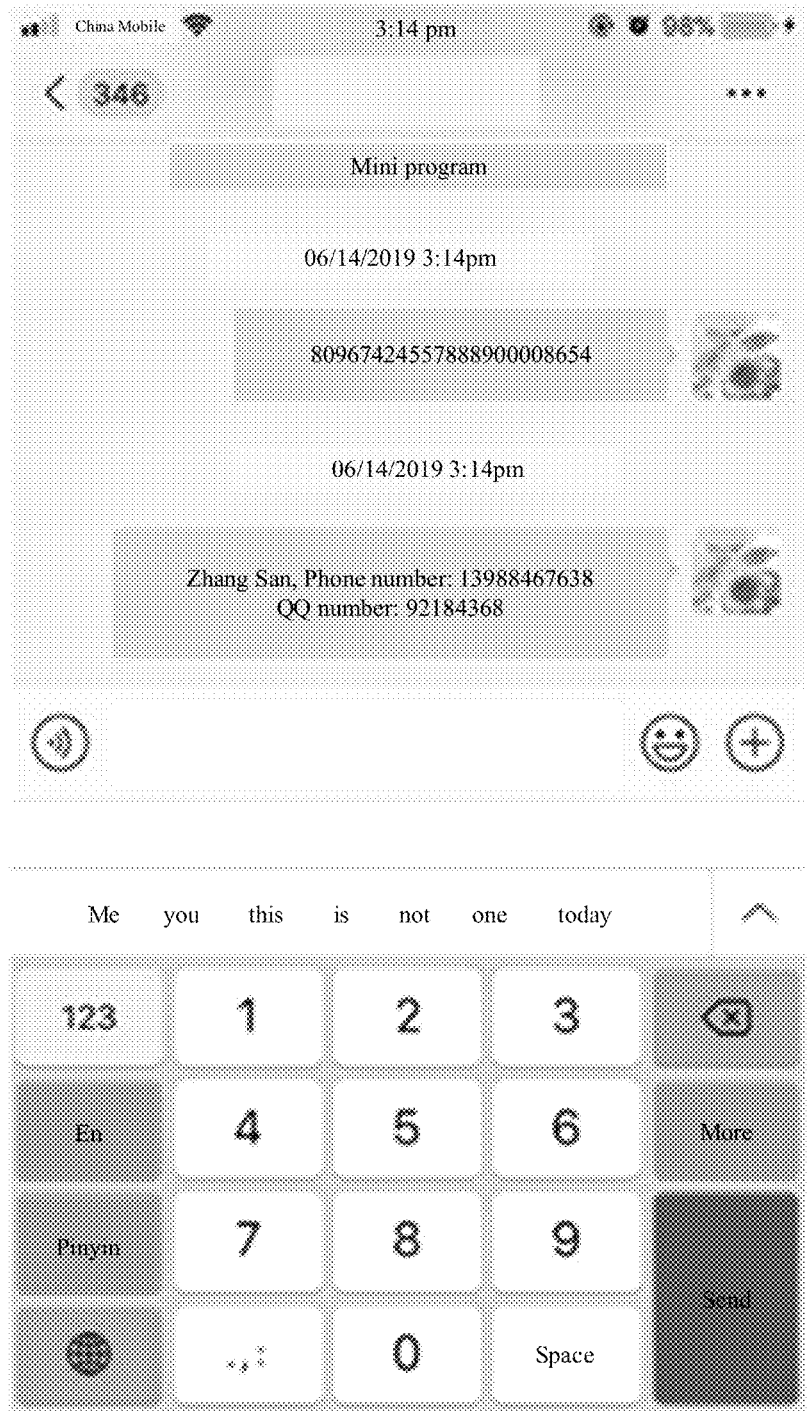
FIG. 3 is a schematic diagram of an interactive interface according to some embodiments of the present disclosure.

In some embodiments of the present disclosure, the first interface and the second interface are different, that is, the first interface and the second interface are different interfaces. Specifically, the first interface is an information input interface, that is, an interface that requires information input, such as a non-interactive interface (a game registration page shown in FIG. 2) or an interactive interface (a chat interface shown in FIG. 3). The second interface is an interface configured to display target input information, that is, the second interface may be configured to display target input information that may only display target input information at the second interface, or display a plurality of information at the second interface, and the plurality pieces of information include the target input information. The disclosure does not limit this, and it depends on the situation.

It should be noted that, in some embodiments of the present disclosure, the number of input areas included in the non-interactive interface is generally different from the number of input areas included in the interactive interface. Wherein, for the interactive interface, generally only one input area is included, and the non-interactive interface generally includes multiple input areas, but the disclosure does not limit this, and it depends on the situation.

Step S12: Responding to a second instruction at the second interface and outputting the target input information in the target input area. That is, after responding to the second instruction at the second interface, the target input information is directly output at the target input area.

It can be seen that the information processing method provided by the embodiments of the present disclosure may directly input the target input information displayed in the second interface into the target input area of the first interface by responding to the second instruction on the second interface. The above-described information processing method input the target information into the target area without leaving the second interface and returning to the position of the target input area in the first interface, thereby improving the input efficiency of the target input information.

It should be noted that, in some embodiments of the present disclosure, the difference between the first interface and the second interface may be that the first interface and the second interface are two independent display windows, or the second interface is a shortcut window of the first interface, which is not limited in the present disclosure, and it depends on the situations.

The following describes the information processing method provided in some embodiments of the present disclosure in combination with different specific implementation manners of the first interface and the second interface.

In an embodiment of the present disclosure, the first interface and the second interface are two independent display windows. Wherein, the first interface is still an information input interface, and the second interface may be any interface that displays target input information, such as a word document interface, a memo interface, a notepad interface, or an information interaction interface (such as the chat interface), etc. The disclosure does not limit this, as long as the second interface is a display window independent from the first interface, and the second interface displays all the target input information. If the second interface is the word document interface, the memo interface, or the notepad interface, etc., the target input information may be backup information pre-stored by the user, including but not limited to the user's name, corresponding ID number, phone number, and email, etc. If the second interface is an information interaction interface (such as the chat interface), the target input information may be any information involved in the information interaction process displayed on the information interaction interface, which may come from any of the interacting parties involved in the information interaction interface, which is not limited in the present disclosure, and it depends on the situations.

Specifically, based on the above-described embodiment, in an embodiment of the present application, the first instruction includes a first sub-instruction, and the first sub-instruction may be configured to call up the second interface.

It should be noted that, during the process of inputting target input information at the target input area of the first interface, the user may only switch between the first interface and the second interface. For example, when the user needs to input target input information in the target input area, the user may directly call up the second interface, and enter the target input information displayed in the second interface into the target input area. The user may not only switch between the first interface and the second interface but also switch between at least one third interface. When the user needs to enter the target input information in the target input area, the user may be attracted by a pop-up window. The user may open the pop-up window to browse the pop-up information, then call up the second interface and enter the target input information displayed in the second interface into the target input area. Or, when the user needs to input target input information in the target input area, the user may temporarily open at least one third interface. After performing some operations in the third interface, then the user calls up the second interface and enters the target input information displayed in the second interface into the target input area.

Thus, based on the above-described embodiment, in an embodiment of the present disclosure, in response to a first instruction, calling up the target input information corresponding to the target input area in at least one input area includes responding to the first sub-instruction at the first interface to call up the second interface, wherein the target input information is displayed at the second interface, such as executing a preset long-press instruction or a preset right-click instruction on the first interface to call up the second interface. The present disclosure does not limit this, and it depends on the situation. In another embodiment of the present disclosure, in response to the first instruction, calling up the target input information corresponding to the target input area in the at least one input area includes responding to the first sub-instruction at the third interface to call up the second interface, wherein the target input information is displayed at the second interface. Wherein, the third interface is an interface different from the first interface and the second interface. The third interface may be a news browsing interface, an online shopping interface, or a main menu interface, etc., which is not limited by the present disclosure, as long as the first sub-command can be guaranteed to open the second interface.

It should be noted that if the second interface includes the plurality piece of information, a pointer of the second interface needs to be moved to the position where the target input information is located at the second interface before the target input information is input into the target input area. Thus, based on any of the above-described embodiments, in an embodiment of the present disclosure, the first instruction further includes a second sub-instruction. In response to the second sub-instruction on the second interface, the pointer may be moved to the position where the target input information is located at the second interface, so as to facilitate subsequent execution of the second instruction for the target input information.

It can be seen from the above description, in some embodiments of the present disclosure, the first interface may include only one input area or a plurality of input areas. In some embodiments of the present disclosure, the target input area is any one input area of the at least one input area.

The game registration page is taken as an example, as shown in FIG. 2, the game registration page includes a name input area, a phone input area, a QQ number input area, a game account input area, a nickname input area, and an email input area, etc. In some embodiments of the present application, the target input area may be any of the input area of the name, the input area of the phone, the input area of the QQ number, the input area of the game account, the input area of the nickname, or the input area of the email, etc., regardless of the position of the pointer of the first interface. That is, in some embodiments of the present disclosure, the target input area may be the input area where the pointer in the first interface is located (such as the input area of the name). The target input area may also be an input area where the pointer is not in the first interface (such as an input area of a phone), which is not limited in the present disclosure, and it depends on the situation.

Figure 4:
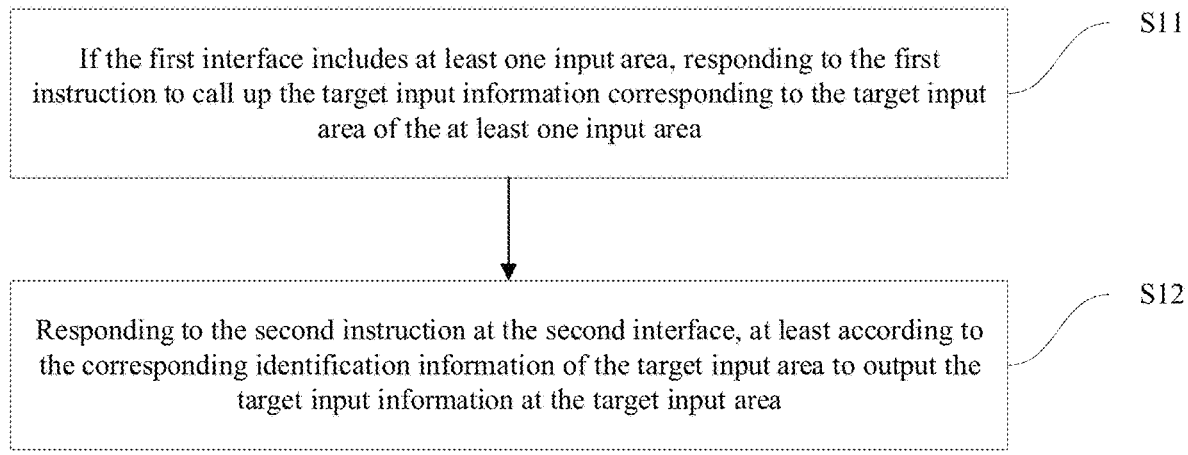
FIG. 4 is a schematic flowchart of another information processing method according to another embodiment of the present disclosure.

Based on any of the above-described embodiments, in some embodiments of the present disclosure, as shown in FIG. 4, in response to a second instruction at the second interface, outputting the target input information in the target input area includes responding to a second instruction on the second interface and outputting the target input information in the target input area at least based on the identification information corresponding to the target input area. That is, in some embodiments of the present disclosure, each input area in the first interface includes its corresponding identification information. If the first interface includes a plurality of input areas, different input areas correspond to the different identification information.

Specifically, in some embodiments of the present disclosure, different identification information is assigned to each input area of the first interface in advance. The identification information may include but is not limited to the ID of the input area, the description information, or the information of the interface to which it belongs. On the premise that different identification information is assigned to each input area of the first interface, the second instruction may be responded at the second interface, and the target input information may be output in the target input area based at least on the identification information corresponding to the target input area.

It should be noted that, in this embodiment of the application, the input areas of different first interfaces may correspond to the same identification information. For example, the identification information corresponding to an nth input area of the different first interfaces is n, where n is a positive integer not less than 1, that is, the identification information corresponding to the first input area of different first interfaces are all 1, and the identification information corresponding to the second input area of different first interfaces are all 2, and so on. However, the present disclosure is not limited to this. In some other embodiments of the present disclosure, the input areas of different first interfaces may also correspond to different identification information, depending on the situation.

Figure 5:
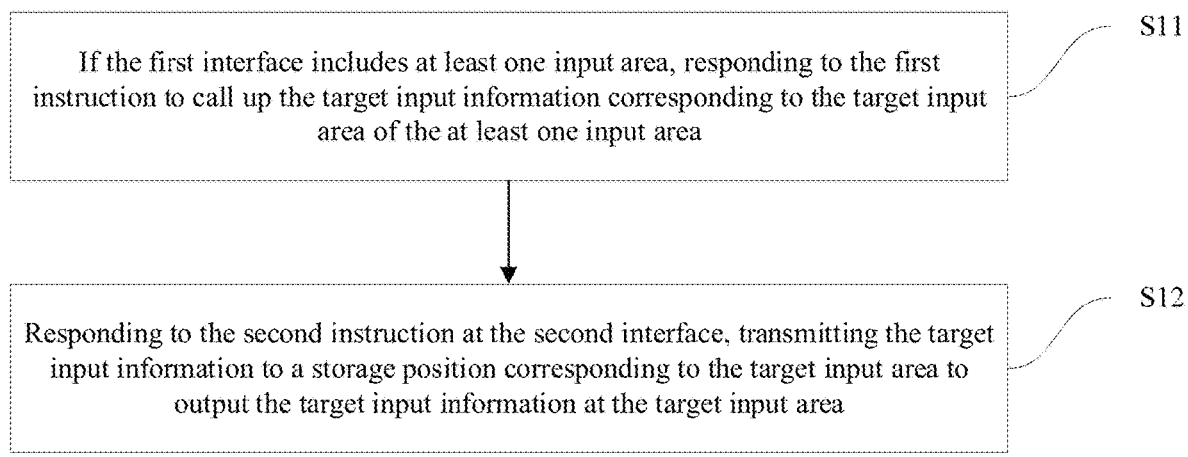
FIG. 5 is a schematic flowchart of still another information processing method according to another embodiment of the present disclosure.

Optionally, based on the above-described embodiments, in some embodiments of the present disclosure, the second instruction is a sending instruction, and the sending instruction is configured to transmit the target input information to a storage location corresponding to the target input area of the first interface according to a selection instruction, such that the target input area outputs the target input information. Wherein, the selection instruction is related to the identification information corresponding to the target input area. That is, in the embodiment, as shown in FIG. 5, responding to a second instruction at the second interface and outputting the target input information at the target input area includes responding to a sending instruction at the second interface and transmitting the target input information to the storage location corresponding to the target input area of the first interface according to the selection instruction, such that the target input area outputs the target input information. Wherein, the selection instruction is related to the identification information corresponding to the target input area. Specifically, the selection instruction may be understood as an instruction to select the storage location to where the target input information is transmitted according to the identification information corresponding to the target input area.

The user's operation process at the second interface is described by still taking the game registration page shown in FIG. 2 as an example. For example, the identification information of the name input area is 1, the identification information of the phone input area is 2, and the identification information of the QQ number input area of is 3, the identification information of the game account input area is 4, the identification information of the nickname input area is 5, the identification information of the email input area is 6, and the content displayed on the second interface is shown in FIG. 6. In a specific operation, first call up a backup window of a sending position at the position of the target input information of the second interface, and then select a target window in the backup window of the sending position and click the target window to output the target input information at the target input area. For example, if the target input area is the name input area, in the second interface, select the location of "Zhang San" to send to 1, point the pointer to 1, and click 1, such that "Zhang San" is input at the name input area. If the target input area is the phone input area number, in the second interface, select the location of "15088569845" to send to 2, point the pointer to 2, and click 2, such that "15088569845" is input at the name input area.

It can be seen, for the information processing method provided by the embodiments of the present disclosure, the position of the target input area is not related to the position of the pointer of the first interface. If the first interface includes a plurality of input areas, the second instruction may be responded to at the second interface. The target input information is transmitted to the storage location corresponding to the target input area of the first interface according to the selection instruction, such that the target input area outputs the target input information, such that the second interface may complete the information input at the plurality of input areas of the first interface instead of returning to the first interface to move the pointer position after completing the input of a target input information, re-determine the target input area, and then return to the second interface to respond to the second instruction, enter the target input information in the new target input area, the operation is easier, the input efficiency is higher.

For another embodiment of the present disclosure, as shown in FIG. 7, responding to the second instruction at the second interface and outputting the target input information at the target input area includes responding to a paste shortcut instruction at the second interface, and transmitting the target input information to the corresponding storage position of the input area of the first interface, so as to output the target input information at the target input area.

Wherein, the identification information of the target input area corresponds to the paste shortcut instruction of the target input information. The paste shortcut instructions corresponding to different input areas are different. Specifically, in some embodiment of the present disclosure, the paste shortcut instruction may be understood as an instruction that combines a paste shortcut key and the identification information of the input area. If the identification information of the name input area is 1, the paste shortcut instruction corresponding to the name input area is Ctrl+1. If the identification information of the phone input area is 2, the paste shortcut instruction corresponding to the phone input area is Ctrl+2.

The user's operation process performed at the second interface is described by still taking the game registration page shown in FIG. 2 as an example. For example, the identification information of the name input area is 1, the identification information of the phone input area is 2, and the identification information of the QQ number input area of is 3, the identification information of the game account input area of is 4, the identification information of the nickname input area is 5, and the identification information of the email input area is 6. If the target input area is the name input area, select "Zhang San", as shown in FIG. 8, "Zhang San" is at a selected state, and click Ctrl+1 to input "Zhang San" at the name input area.

It can be seen that the information processing method provided by embodiments of the present disclosure may directly input the target input information into the target input area by responding to the second instruction at the second interface. For the above-described method, the user does not need to leave the second interface and return to the location of the target input area of the first interface to input the target input information into the target input area. As such, the information processing method provided by embodiments of the present disclosure simplifies the operation of the target input information and improves the input efficiency of the target input information.

Moreover, for the information processing method provided by the embodiments of the present disclosure, the position of the target input area is not related to the position of the pointer in the first interface. If the first interface includes a plurality of input areas, the second instruction may be responded to the plurality times at the second interface. The target input information is transmitted to the storage location corresponding to a plurality of target input areas of the first interface according to the selection instruction, such that the target input area outputs the target input information, such that the second interface may complete the information input at the plurality of input areas of the first interface, thereby simplifying the operation and improving the input efficiency.

In another embodiment of the present disclosure, the second interface may be a shortcut window of the first interface. The information processing method provided by the embodiments of the present disclosure is described below by combining the second interface being a shortcut window of the first interface.

Specifically, in the embodiment of the present disclosure, the first interface is still an information input interface, and the second interface is a display window related to a toolbar display window of the first interface. It should be noted that, in the embodiment of the present disclosure, the target input area is the pointer position of the first interface, and the information of the second interface is stored backup information. Optionally, the backup information may include, but is not limited to, commonly used information stored by the users in advance, such as name, phone number, ID number, email address, etc.

It should be noted that, based on the above-described embodiment, in an embodiment of the present disclosure, after opening the first interface, the second interface is at a hidden state. The second interface is called up by responding to the first instruction at the first interface. Specifically, in an implementation manner of the present disclosure, after opening the first interface, a default state of the second interface is the hidden state. When an upper-level window of the second interface is clicked, the second interface may be displayed at the toolbar display window of the first interface.

In another implementation manner of the present disclosure, after opening the first interface, the default state of the second interface is a common state. When the upper-level window of the target input information of the second interface is clicked, the target input information is called up, however, the present disclosure is not limited to this. In other embodiments of the present disclosure, other implementation manners may be configured to respond to the first instruction at the first interface to call up the second interface and the target input information of the second interface, which depends on the situation.

Specifically, based on any of the above-described embodiments, in an embodiment of the present disclosure, each information of the second interface is listed and displayed at the second interface. In the embodiment, the first instruction includes a first sub-instruction and a second sub-instruction. The first sub-instruction is responded at the first interface, so as to call up the second interface. The second sub-instruction is responded at the second interface, so as to move the pointer to the position where the target input information is located, so as to facilitate subsequent execution of the second instruction on the target input information.

In another embodiment of the present disclosure, each information of the second interface is classified and displayed at the second interface, that is, the stored backup information of the second interface may be classified and stored. For example, the information classified as the name is stored at the first display window, the information classified as the telephone is stored in the second display window, the first display window is different from the second display window. When the second interface is called up, the second interface only displays catalogs of information. In the embodiment, the first instruction includes the first sub-instruction and the second sub-instruction. The first sub-instruction is responded at the first interface to call up the second interface. The second sub-instruction includes a third sub-instruction and a fourth sub-instruction. The third sub-instruction is responded at the second interface to move the pointer to a category of the target input information in the second interface, so as to call up the backup information. The backup information at least includes the target input information. The fourth sub-instruction is responded at the second interface to move the pointer to the position of the target input information in the second interface, so as to facilitate subsequent execute the second instruction to the target input information.

Figure 10:
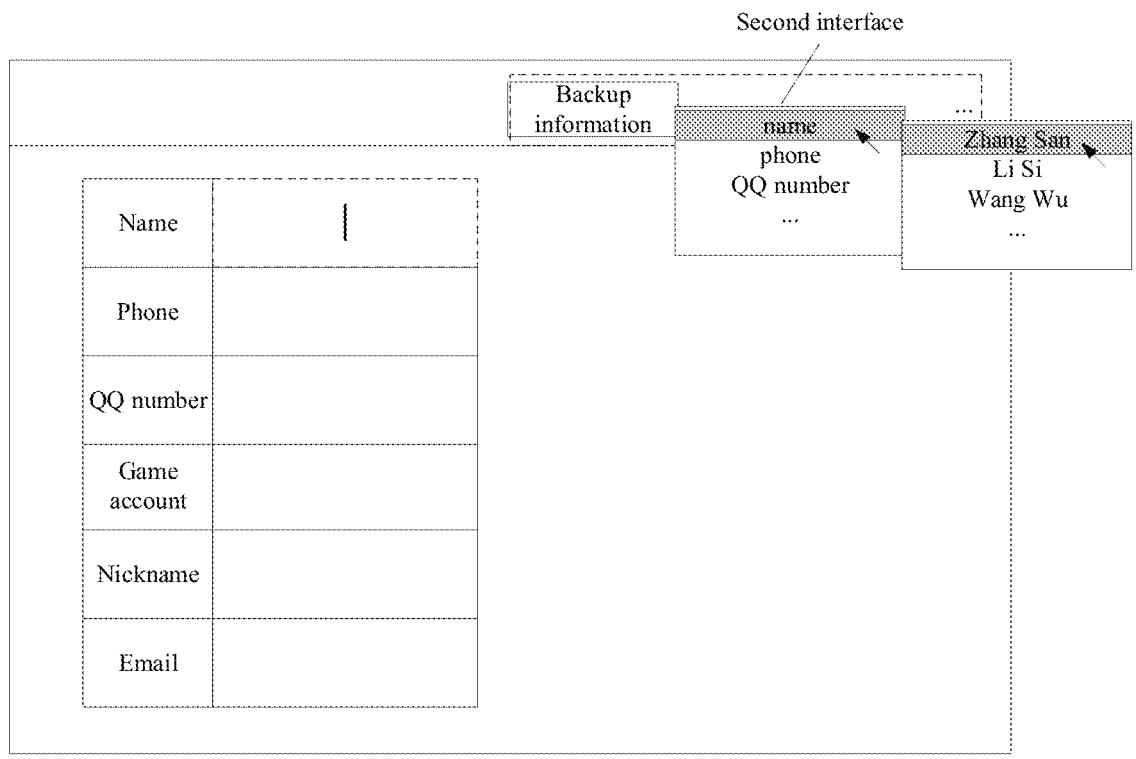
FIG. 10 is a schematic diagram of the call-up operation process of the target input information according to some embodiments of the present disclosure.

In the embodiments, the operation process for calling up the target input information by responding to the third sub-instruction and the fourth sub-instruction is described by still taking the game registration page shown in FIG. 2 as an example. For example, as shown in FIG. 9 and FIG. 10, the target input area is the name input area where the pointer is located. If the input information is "Zhang San", the first sub-instruction is firstly responded at the first interface to call up the second interface. Then, the third sub-instruction is responded at the second interface to move the pointer to the position of the category of name to call up the backup information which at least includes "Zhang San". Finally, the fourth sub-instruction is responded at the second interface to move the pointer to the position where "Zhang San" is located, so as to facilitate subsequent execute the second instruction at "Zhang San".

Based on any of the above-described embodiments, in an embodiment of the present disclosure, the second instruction may be a selection instruction. The selection instruction is configured to determine the target input information of at least one information at the second interface, so as to output the target input information at the target input area.

It can be seen that embodiments of the present disclosure provide the information processing method, the first instruction is responded at the first interface to call up the second interface located at the toolbar window. The information processing method may execute the selection instruction on the target input information of the second interface, so as to input the target input information to the position where the pointer locates, such that there is no need to switch interface. The operation is simple, quick, and convenient, and the input efficiency is high.

Based on any of the above-described embodiments, in an embodiment of the present disclosure, the information processing method further includes editing the information of the second interface to ensure the timeliness of the information and comprehensiveness. Specifically, in an implementation manner of the present disclosure, performing edit of the information of the second interface includes editing the stored backup information of the second interface, such as modifying and/or deleting. In another embodiment of the present disclosure, performing an edit of the information of the second interface may further include adding new backup information to the second interface.

Based on the above-described embodiments, in an embodiment of the present disclosure, adding new backup information to the second interface includes inputting information at the second interface and adding the input information to the backup information of the second interface. Wherein, the input information is different from the stored information of the second interface. In another embodiment of the present disclosure, adding new backup information to the second interface includes selecting at least partial display information of the first interface and adding the selected at least partial display information to the backup information of the second interface. Wherein, the selected at least partial display information is different from the stored information of the second interface. For example, the Li Si's ID number needs to be input at the target input area of the first interface, but the second interface does not display the Li Si's ID number. As such, after inputting Li Si's ID number in the target input area, select Li Si's ID number and add it to the backup information on the second interface for subsequent use.

It can be seen that embodiments of the present disclosure provide the information processing method. The information processing method provided by the embodiments of the present disclosure may call up the second interface located in the toolbar window by responding to the first instruction at the first interface. The selection instruction is executed on the target input information located in the second interface, and the target input information is input into the position of the pointer in the first interface without switching the interface back and forth, the operation is simple and fast, and the input efficiency is high.

Correspondingly, embodiments of the present application also provide an information processing apparatus. The information processing apparatus provided by the present disclosure is described in the following. The information processing apparatus described below and the above-described information processing method may be referred to each other.

Figure 11:
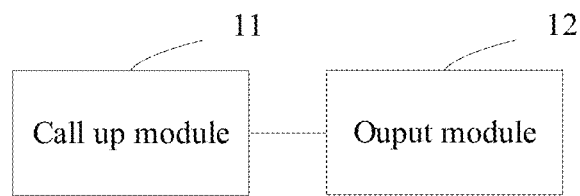
FIG. 11 is a schematic diagram of an information processing apparatus according to some embodiments of the present disclosure.

Referring to FIG. 11, the information processing apparatus provided by the embodiment of the present application includes a call-out module 11 and an output module 12. Wherein, the call-up module is configured to respond to the first instruction if the first interface includes at least one input area. After responding to the first instruction, the call-up module is configured to call up the target input information corresponding to the target input area in the at least one input area. Wherein, the target input information is one of the at least one piece of information of the second interface. The output module is configured to respond to a second instruction at the second interface and output the target input information in the target input area. Wherein, the first interface is different from the second interface.

Based on the above-described embodiments, in an embodiment of the present disclosure, the second interface and the first interface are two independent display windows. The target input area may be any one input area of the at least one input area.

Based on the above-described embodiments, in an embodiment of the present disclosure, the output module is configured to respond to the second instruction at the second interface. When outputting the target input information in the target input area, the output module is specifically configured to output the target input information in the target input area based at least on the identification information corresponding to the target input area.

In an implementation manner of the embodiment, the second instruction may be the sending instruction. In the implementation manner, the output module is configured to respond to the second instruction at the second interface. When outputting the target input information in the target input area, the output module is specifically configured to respond to the sending instruction at the second interface and transmits the target input information to the storage location corresponding to the target input area of the first interface according to the selection instruction, such that the target input area may output the target input information. Wherein, the selection instruction is related to the identification information corresponding to the target input area. In another implementation manner of the embodiment, the second instruction is a paste shortcut instruction, and the identification information of the target input area corresponds to the paste shortcut instruction of the target input information. In the implementation manner, the output module is configured to respond to a second instruction at the second interface. When outputting the target input information in the target input area, the output module is specifically configured to respond to a paste shortcut instruction at the second interface and transmit the target input information to the storage location corresponding to the target input area of the first interface, such that the target input area may output the target input information. However, the present disclosure does not limit this, and it depends on the situation.

In another embodiment of the present disclosure, the second interface is a display window related to the toolbar display window of the first interface, and the target input area is the position of the pointer at the first interface. The information of the second interface is the stored backup information. In an embodiment of the present disclosure, the second instruction is the selection instruction. In the embodiment, the output module is configured to respond to the second instruction at the second interface and output in the target input area. The target input information is specifically configured to respond to a selection instruction at the second interface and determine the target input information in at least one piece of information at the second interface, such that the target input area outputs the target input information.

Based on the above-described embodiment, the information processing apparatus may further include an edit module configured to edit the information at the second interface. In an implementation manner of the embodiment, when the edit module is configured to edit the information in the second interface, the edit module is specifically configured to input information in the second interface and add the input information to the backup information of the second interface. In another implementation manner of this embodiment, when the edit module is configured to edit the information in the second interface, the edit module is specifically configured to select at least parts of the display information of the first interface and add the selected at least parts of the display information to the backup information of the second interface. However, the present disclosure does not limit this, and it depends on the situation.

It should be noted that, in the embodiment, if the first interface includes at least one input area, in response to the first instruction, the call-up module calls up the target input information corresponding to the target input area in the at least one input area, and the second instruction is responded at the second interface. The detailed process of the output module for outputting the target input information to the target input area may refer to the related introductions of the above-described embodiments, which will not be repeated here.

Figure 12:
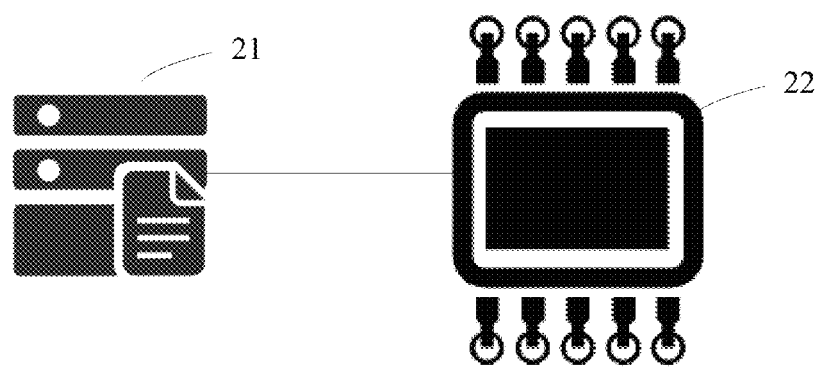
FIG. 12 is a schematic diagram of an electronic apparatus according to some embodiments of the present disclosure.

In addition, embodiments of the present disclosure may also provide an electronic apparatus. Referring to FIG. 12, the electronic apparatus includes a memory 21 and a processor 22. The processor 22 is configured to execute a program stored in the memory 21. The memory 21 is configured to store a program, and the program is configured to execute at least the following method procedures.

If the first interface includes at least one input area, in response to the first instruction, the target input information is called up corresponding to the target input area in the at least one input area, where the target input information is one of the at least one information of the second interface;

The second instruction is responded at the second interface, and the target input information is output at the target input area.

Wherein, the first interface is different from the second interface.

It should be noted that, in the embodiment, the program may also be configured to execute the relevant method procedures of the above-described embodiments, and details will not be repeated here.

In summary, the information processing method, the information processing apparatus, and the electronic apparatus provided by the embodiments of the present disclosure may directly input the target input information into the target input area by responding to the second instruction at the second interface, and the input accuracy of the information processing method is high. The above-described method may input the target input information without leaving the second interface and returning to the location of the target input area in the first interface to input the target input information at the target input area, which simplifies the target input information process, thereby improving the input efficiency of the target input information.

Each part of the specification is described in a progressive way. The description of each part focuses on the difference from other parts, and the same or similar parts between the various parts may be referred to each other.

The above description of the disclosed embodiments enables those skilled in the art to implement or use the present disclosure. Various modifications to these embodiments may be obvious to those skilled in the art. The general principles defined herein may be implemented in other embodiments without departing from the spirit or scope of the present disclosure. Therefore, the present disclosure will not be limited to the embodiments shown in the disclosure but should conform to the widest scope consistent with the principles and novel features disclosed in the disclosure.

What is claimed is:

1. An information processing method, comprising:
   in response to a first interface including a plurality of input areas, responding to a first instruction to call up a second interface, the second interface including a plurality of pieces of information, the plurality of pieces of information including target input information corresponding to a target input area of the plurality of input areas, each of the plurality of input areas corresponding to one of a plurality of pieces of identification information, the target input area corresponding to target identification information included in the plurality of pieces of identification information, each of the plurality of pieces of identification information including a piece of description information of one of the plurality of input areas corresponding to the each of the plurality of pieces of identification information, and responding to the first instruction to call up the second interface including:
      in response to the first instruction, calling up a third interface, the third interface being an interface different from the first interface and the second interface, and the third interface including a news browsing interface or an online shopping interface; and
      in response to a sub-instruction at the third interface, calling up the second interface;
   in response to a second instruction at the target input information of the second interface, calling up a backup window including the plurality of pieces of identification information at a position of the target input information of the second interface;
   after the target input information is selected in the second interface, in response to a third instruction that combines a paste shortcut key and the target identification information being input by a user, outputting the target input information at the target input area in the first interface without another instruction, the first interface being different from and the second interface; and
   editing, in the second interface, the plurality of pieces of information of the second interface including at least one of:
      inputting new information in the second interface and adding the new information to backup information of the second interface;
      modifying one piece of the plurality of pieces of information of the second interface; or
      deleting one piece of the plurality of pieces of information of the second interface.

2. The information processing method of claim 1, wherein:
   the first interface and the second interface are two independent windows; and
   the target input area is any one of the plurality of input areas.

3. The information processing method of claim 1, further comprising:
   in response to the target identification information being selected in the backup window at the second interface, transmitting the target input information to a storage location corresponding to the target input area of the first interface, to output the target input information at the target input area.

4. The information processing method of claim 1, wherein:
   the second interface is a display window associated with a toolbar display window in the first interface;
   the target input area is a position of a pointer in the first interface; and
   the plurality of pieces of information of the second interface include the backup information.

5. The information processing method of claim 1, wherein:
   the second instruction is a selection instruction used to determine the target input information from the plurality of pieces of information of the second interface, to output the target input information at the target input area.

6. The information processing method of claim 1, wherein editing, in the second interface, the plurality of pieces of information of the second interface further includes:
   selecting partial display information from the first interface and adding the selected partial display information to the backup information of the second interface.

7. The information processing method of claim 1, wherein each of the plurality of pieces of identification information further includes a numeral identifier of one of the plurality of input areas corresponding to the each of the plurality of pieces of identification information.

8. The information processing method of claim 7, wherein the third instruction combines the paste shortcut key and the numeral identifier of the target input area.

9. The information processing method of claim 1, wherein in response to the target identification information corresponding to the target input area being 1, the third instruction corresponding to the target input area is Ctrl+1.

10. An information processing apparatus, comprising:
    a memory storing a program; and
    a processor configured to execute the program to:
       in response to a first interface including a plurality of input areas, respond to a first instruction to call up a second interface, the second interface including a plurality of pieces of information, the plurality of pieces of information including target input information corresponding to a target input area of the plurality of input areas, each of the plurality of input areas corresponding to one of a plurality of pieces of identification information, the target input area corresponding to target identification information included in the plurality of pieces of identification information, and each of the plurality of pieces of identification information including a piece of description information of one of the plurality of input areas corresponding to the each of the plurality of pieces of identification information, and responding to the first instruction to call up the second interface including:
    in response to the first instruction, calling up a third interface, the third interface being an interface different from the first interface and the second interface, and the third interface including a news browsing interface or an online shopping interface; and
    in response to a sub-instruction at the third interface, calling up the second interface;
in response to a second instruction at the target input information of the second interface, call up a backup window including the plurality of pieces of identification information at a position of the target input information of the second interface;
after the target input information is selected in the second interface, in response to a third instruction that combines a paste shortcut key and the target identification information being input by a user, output the target input information at the target input area in the first interface without another instruction, the first interface being different from and the second interface; and
edit, in the second interface, the plurality of pieces of information of the second interface including at least one of:
    inputting new information in the second interface and adding the new information to backup information of the second interface;
    modifying one piece of the plurality of pieces of information of the second interface; or
    deleting one piece of the plurality of pieces of information of the second interface.

11. The information processing apparatus of claim 10, wherein:
the first interface and the second interface are two independent windows; and
the target input area is any one of the plurality of input areas.

12. The information processing apparatus of claim 10, wherein the processor is further configured to execute the program to:
in response to the target identification information being selected in the backup window at the second interface, transmit the target input information to a storage location corresponding to the target input area of the first interface, to output the target input information at the target input area.

13. The information processing apparatus of claim 10, wherein:
the second interface is a display window associated with a toolbar display window in the first interface;
the target input area is a position of a pointer in the first interface; and
the plurality of pieces of information of the second interface include the backup information.

14. The information processing apparatus of claim 10, wherein:
the second instruction is a selection instruction used to determine the target input information from the plurality of pieces of information of the second interface, to output the target input information at the target input area.

15. The information processing apparatus of claim 10, wherein the processor is further configured to execute the program to:
select partial display information from the first interface and add the selected partial display information to the backup information of the second interface.

16. An information processing method, comprising:
in response to a first interface including a plurality of input areas, responding to a first instruction to call up a second interface, the second interface including a plurality of pieces of information, the plurality of pieces of information including target input information corresponding to a target input area of the plurality of input areas, each of the plurality of input areas corresponding to one of a plurality of pieces of identification information, and the target input area corresponding to target identification information included in the plurality of pieces of identification information, and responding to the first instruction to call up the second interface including:
    in response to the first instruction, calling up a third interface, the third interface being an interface different from the first interface and the second interface, and the third interface including a news browsing interface or an online shopping interface; and
    in response to a sub-instruction at the third interface, calling up the second interface;
in response to the target input information being selected in the second interface, calling up a first backup window at the position of the target input information of the second interface, the first backup window indicating a sending position of the target input information; and
in response to the first backup window being selected, calling up a second backup window including the plurality of pieces of identification information at a position of the first backup window in the second interface;
after the target input information is selected in the second interface, in response to a third instruction that combines a paste shortcut key and the target identification information being input by a user, outputting the target input information at the target input area in the first interface without another instruction, the first interface being different from and the second interface; and
editing, in the second interface, the plurality of pieces of information of the second interface including at least one of:
    inputting new information in the second interface and adding the new information to backup information of the second interface;
    modifying one piece of the plurality of pieces of information of the second interface; or
    deleting one piece of the plurality of pieces of information of the second interface.

\* \* \* \* \*